Figure 1:
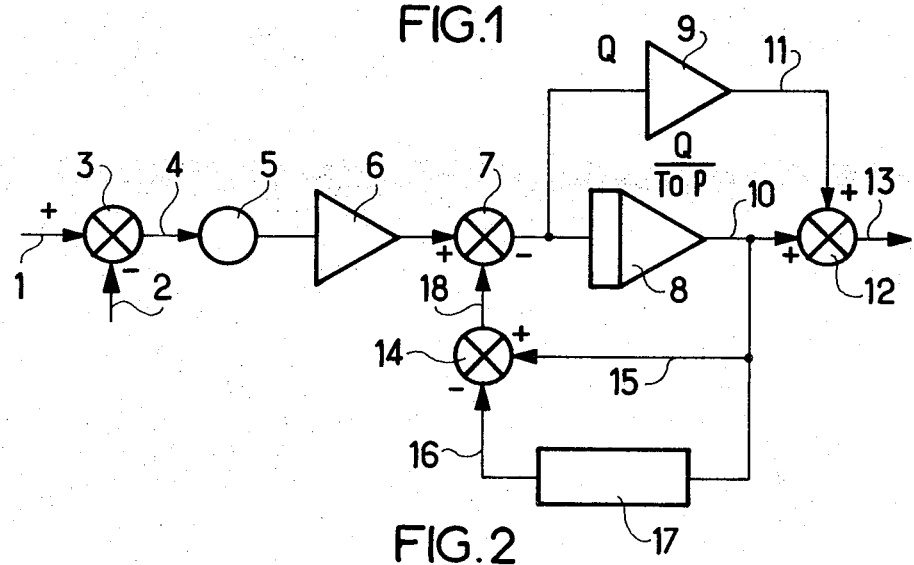

United States Patent [19]
Chevalier et al.

[11] 3,864,554
[45] Feb. 4, 1975

[54] TIME DELAY COMPENSATION IN A CLOSED-LOOP PROCESS CONTROL SYSTEM

[75] Inventors: Gabriel Chevalier, Grenoble; Roland Rouxel, Biviers, both of France

[73] Assignee: Societe Generale De Constructions Electriques et Mecaniques (Alsthom), Cedex, France

[22] Filed: Nov. 27, 1972

[21] Appl. No.: 309,883

Related U.S. Application Data

[63] Continuation-in-part of Ser. No. 211,803, Dec. 23, 1971, Pat. No. 3,790,764.

[30] Foreign Application Priority Data
Nov. 29, 1971 France .............................. 71.42791

[52] U.S. Cl. .............................. 235/150.1, 318/561
[51] Int. Cl. .............................................. G05f 11/01
[58] Field of Search .................................. 235/150.1

[56] References Cited
UNITED STATES PATENTS
| | | | |
|---|---|---|---|
| 3,273,035 | 9/1966 | Inderhees | 318/18 |
| 3,613,419 | 10/1971 | Silva | 72/8 |

*Primary Examiner*—Eugene G. Botz

[57] ABSTRACT

A closed-loop feedback control system for industrial processes, wherein a corrector receives a signal of variation and produces a process-regulating signal in the form of a transfer function $F \times G$, wherein G represents a transfer function which is the equivalent unretarded transfer function of the controlled process and F is the factor of retardation. The corrector comprises a first and a second subtracter, a first group of circuit elements upstream of the elements of regulation connecting the input of the corrector to a first input of the first subtracter and constituted by elements having a proportional action, a second group of circuit elements downstream of the elements of regulation which include two circuits connected in parallel: the one circuit being constituted by elements having a proportional action, the other circuit being constituted by an integrator, said two circuits being connected to each other at their inputs, and an adder of which the inputs receive respectively the outputs of the two circuits, and which connect the output of the first subtracter to the output of the corrector, connecting means between the output of said integrater and a first input of the second subtracter, a retarding circuit having the transfer function F and connecting the output of said integrator to a second input of the second subtracter, and means for applying the output of the second subtracter to the second output of the first subtracter.

2 Claims, 2 Drawing Figures

TIME DELAY COMPENSATION IN A CLOSED-LOOP PROCESS CONTROL SYSTEM

This application is a continuation-in-part of application Ser. No. 211,803, filed Dec. 23, 1971, now U.S. Pat. No. 3,790,764.

Numerous industrial processes are regulated by closed-loop feedback control systems which compare a value measured in the system with the value of an order or instruction to obtain a signal of variation or difference between such two values. Such last signal is introduced into a corrector which produces the signal for regulating the process.

These processes often present a quite substantial retardation between the time of application of the regulating signal and the response thereto from the process. In closed-loop process-regulating systems of the classical type: proportional-integral-differential, the effect of these retardations is to produce a response of the system which is more or less oscillating and unstable. This instability may be partially corrected by reducing the gain of the closed-loop system, but this inevitably results in a reduction of the static precision of the system which may not be tolerable in a given process.

The present invention is an improvement upon that disclosed and claimed in the patent to Roland Rouxel et al., U.S. Pat. No. 3,644,719 issued Feb. 22, 1972, which is assigned to the present assignee. The system of the Rouxel et al., patent mitigates the deleterious effect of time lag in an industrial process on the operation of a closed-loop feedback control system. The system of the patent provides, in a process having a transfer function F × G, where G is an unretarded equivalent transfer function of the process, and F is the factor of retardation, a closed-loop regulating system in which the corrector receives the signal of variation and produces the signal for regulating the process. The corrector includes a first and second subtracter, a first group of regulating elements connecting the input of the corrector to a first input of the first subtracter, a second group of elements having a transfer function H equal to the product of G × the transfer function $C_1$ of the first group, and connecting the output of the corrector to the first input of the second subtracter, the retarding circuit having the transfer function F and connecting the output of the second group of elements to the second input of the second subtracter, means for applying the output of the second subtracter to the second input of the first subtracter, and a third group of elements for transferring the output of the first subtracter to the output of the corrector.

In application Ser. No. 211,803, filed Dec. 23, 1971, which is a division of the application which matured into said Rouxel U.S. Pat. No. 3,644,719, there is disclosed a correcter of the above type adapted for use in a process in which $G = K_o/(1+pT_o)$, the correcter being constituted by a first group of elements which multiply the signal of variation by a coefficient $C_1 = 1/K_o$, a second group of elements in which the transfer function H is equal to $1/(1+pT_o)$, and a third group elements of which the transfer function $C_2$ is: $Q[1+(1/Top)]$. In such structure, the third group of elements includes two circuits connected in parallel one of which is constitutes by an integrater and the other by proportionally acting elements and an adder which adds the signals emitted by the two parallel circuits. The second group of elements includes an integrater. See for example the circuit illustrated in FIG. 4 of application Ser. No. 211,803.

A present invention has among its objects the simplification of the above described correcter by eliminating the integrater in the second group of elements.

In accordance with the present invention, a first input of the second subtracter is connected, not to the output of the correcter, as in the above-described prior correcter, but to the output of the integrater of a third group of elements of the correcter, and this connection is effected by a simple circuit.

Figure 2:
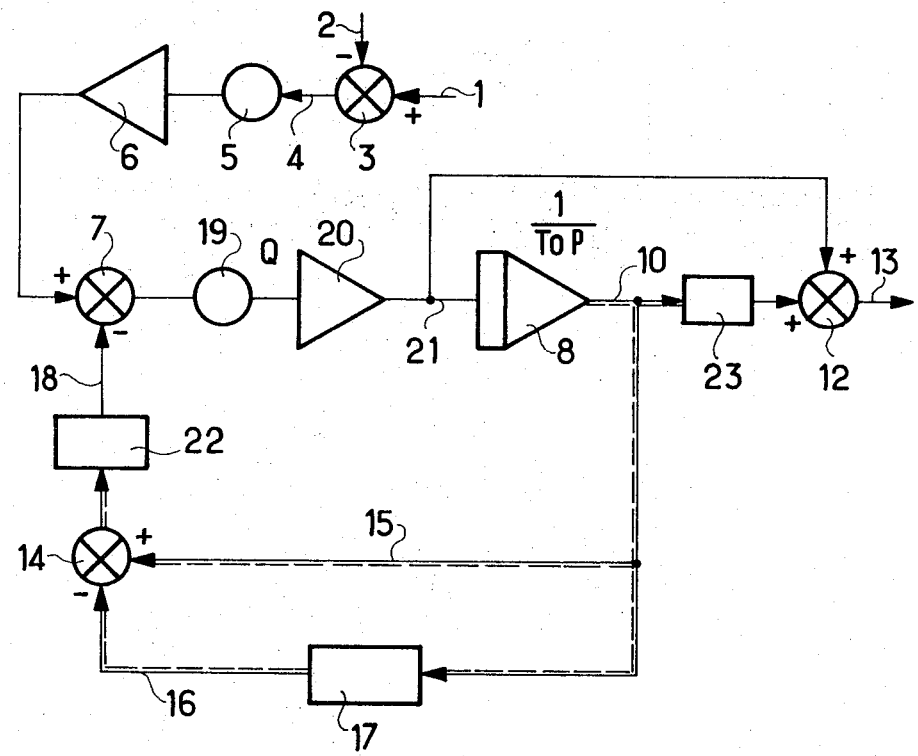

The nature of the invention and its advantages will appear more fully from the following detailed description taken in conjunction with the appended drawing, in which:

FIG. 1 is a combined block in schematic diagram of a first embodiment of the arrangement in accordance with the present invention; and FIG. 2 is a combined block in schematic diagram similar to FIG. 1, but including analog-digital conversion facilities.

It will be assumed, in the discussion of the embodiment shown in the drawing, that the process to which the regulator is applied, has a transfer function in the form $$G(p) \times F(e^{-T_o p}), \text{ where}$$

To is the constant of equivalent time (tau$_o$),

P is the Laplace operator.

In the embodiment of FIG. 1, the value of a command signal applied to terminal 1 and is compared in a subtracter 3 with the output of the process which is fed back via a line 2 to one input of the subtracter 3. The resulting error signal from the output of subtracter 3 is fed by line 4 into a corrector of process regulation, such corrector including a group of stream elements of regulation constituted by a potentiometer 5 in an amplifier 6, the transfer function $C_1$ of such first or upstream group being equal to $1/K_o$, an output of the amplifier 6 being fed into a second subtracter 7. The corrector has a second, downstream group of regulating elements constituted by the integrator 8 and an amplifier 9 which are connected in parallel between the output of the second subtracter 7 and an adder 12, the output wires 10 and 11 of the integrator 8 and the amplifier 9, respectively, being connected to inputs of the adder 12. The output of the adder 12, which is emitted through wire 13, as the process regulating signal of the corrector. Such second or downstream group of elements has a transfer function $C_2 = Q[1 + (1/Top)]$. The prediction signal of the regulator is composed in part of the output of the integrator 8. The signal provided in wire 10 arrives at a third subtracter 14 in part directly through a wire 15 and in part through a wire 16 after having passed through a retarding circuit 17. The retardation circuit 17 may illustratively be of the type shown in FIGS. 8 and 9 of U.S. Pat. No. 3,644,719 issued Feb. 22, 1972 and assigned to the assignee of the instant invention. The prediction signal thus formed enters the subtracter 7 through the wire 18.

The branching of the prediction circuit at wire 10, and not at the output 13 of the corrector as in prior systems, permits a considerable simplification of the prediction circuit since there is obtained directly in the integrator 8 a transfer function $Q/Top = C_2.H$, H being equal to $C_1 G$.

The gain of the amplifier 9 is Q, and the transfer function of the integrator 8 is $Q/Top$. There are thus assured two connected regulators connected to each other, one of these being the amplifier 9 and the other being the integrator 8.

In the system of FIG. 2, wherein the elements which are cited in FIG. 1 designated by the same reference characters, series connected potentiometer 19 and amplifier 20 are connected upstream of the integrator 8. The input 21 of the integrator 8 is connected directly to the adder 12. Thus, there is only one regulator for Q, the transfer function of the integrator 8.

Integrator 8' is a numerical integrator which at the same time plays the role of an analog-digital converter the value of the output of which serves to place the prediction signal in a numerical form. The prediction signal thus formed passes to a digital-analog-converter 22 before being introduced to the regulating elements of the system. The digital-analog-converter 23 is also inserted between the integrator 8 and the adder 12. In FIG. 2 a similar or digital transmission of information in the system has been shown by double lines of which one line is a dash line.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A feedback control system for regulating a time-retarded process having a transfer function F×G where G represents an equivalent unretarded transfer function and F represents a factor of retardation, the control system input being coupled to a control signal representative of the deviation of a process output from a reference value, the control system comprising:

first and second subtracters;
   a first group of first linear elements for coupling the error signal from the control system input to the first input of the first subtracter;
   a second group of elements including an integrating element and a second linear element, an adder having first and second inputs and an output constituting the output of the control system, first means for connecting the output of the second linear element to the first input of the adder, and second means for connecting the output of the integrating element to the second input of the adder;
   third means for connecting the output of the first subtracter to the inputs of the integrating element and the second linear element;
   fourth means for connecting the output of the integrating element to the first input of the second subtractor;
   a retarding circuit having a transfer function equal to F and coupled between the output of the integrating element and the second input of the second subtractor; and
   fifth means for connecting the output of the second subtractor to the second input of the first subtractor.

2. A system according to claim 1, wherein said integrating element includes an analog-digital converter, the retarding circuit is constituted by digital elements, and the fifth connecting means comprises a digital-analog converter.

* * * * *